(12) United States Patent
Haertel (10) Patent No.: US 7,427,019 B2
(45) Date of Patent: Sep. 23, 2008

(54) BIOMETRIC IDENTIFICATION SYSTEM, METHOD AND MEDIUM FOR POINT OF SALE ENVIRONMENT

(75) Inventor: Scott James Haertel, Hanover Park, IL (US)

(73) Assignee: HSBC North America Holdings Inc., Prospect Heights, IL (US)

( * ) Notice: Subject to any disclaimer, the term of this patent is extended or adjusted under 35 U.S.C. 154(b) by 180 days.

(21) Appl. No.: 11/210,662

(22) Filed: Aug. 25, 2005

(65) Prior Publication Data

US 2006/0043169 A1 Mar. 2, 2006

Related U.S. Application Data

(60) Provisional application No. 60/604,054, filed on Aug. 25, 2004.

(51) Int. Cl.
*G06K 5/00* (2006.01)
(52) U.S. Cl. ............... 235/380; 235/379; 235/383; 705/39; 705/44
(58) Field of Classification Search ............ 235/379, 235/380, 383; 705/39, 44
See application file for complete search history.

(56) References Cited

U.S. PATENT DOCUMENTS

| | | | |
|---|---|---|---|
| 5,438,186 A | 8/1995 | Nair et al. | |
| 5,767,496 A | 6/1998 | Swartz et al. | |
| 5,802,199 A * | 9/1998 | Pare et al. | 382/115 |
| 5,930,380 A * | 7/1999 | Kashi et al. | 382/119 |
| 6,234,389 B1 | 5/2001 | Valliani et al. | |
| 6,307,956 B1 | 10/2001 | Black | |
| 6,522,772 B1 * | 2/2003 | Morrison et al. | 382/124 |
| 6,856,965 B1 | 2/2005 | Stinson et al. | |
| 2002/0082989 A1 * | 6/2002 | Fife et al. | 705/39 |
| 2002/0128864 A1 | 9/2002 | Maus et al. | |
| 2002/0133461 A1 | 9/2002 | Ramachandran | |
| 2004/0234117 A1 * | 11/2004 | Tibor | 382/137 |

OTHER PUBLICATIONS

International Preliminary Report on Patentability for PCT Application No. PCT/US2005/030074. Feb. 16, 2007.
International Search Report and Written Opinion for PCT Application No. PCT/US2005/030074. Sep. 11, 2006.

* cited by examiner

*Primary Examiner*—Michael G. Lee
*Assistant Examiner*—Ali Sharifzada
(74) *Attorney, Agent, or Firm*—Irah H. Donner; Wilmer Cutler Pickering Hale and Dorr LLP (57) ABSTRACT

Embodiments of the present invention provide a biometric identification system, method and product for facilitating a transaction in a point of sale environment. In one embodiment, the biometric identification system facilitates creating or updating a biometric template based on biometric samples received from an existing customer belonging to an existing predetermined customer group, and approving a transaction at the point of sale terminal based on a validated biometric sample received from a verified customer.

44 Claims, 10 Drawing Sheets

BIOMETRIC IDENTIFICATION SYSTEM, METHOD AND MEDIUM FOR POINT OF SALE ENVIRONMENT

This application claims priority under 35 U.S.C. §119 to U.S. Provisional Application No. 60/604,054, titled "Biometric Identification System, Method and Medium for Point of Sale Environment," filed Aug. 25, 2004, and assigned to HSBC North America Holdings, Inc, which is incorporated herein by reference in its entirety.

FIELD OF THE INVENTION

This invention generally relates to a biometric identification system, and particularly to a biometric identification system, method and product for facilitating a transaction in a point of sale environment.

BACKGROUND OF THE INVENTION

Most transactions at a retailer's POS (Point of Sale) system require the presence of a physical token to gain access or authorization. Tokens such as magnetic ink encoded paper checks, smart cards, magnetic swipe cards, identification cards or even a personal computer programmed with resident user-specific account data, are "personalized" because they are each programmed or encoded with data that is unique and personalized to the authorized user. The customer then enters the account number from the physical token through a magnetic stripe reader, through a contactless transmission (Radio Frequency or Infrared), or through the manual entry via a numeric keyboard. Whether a consumer is buying groceries with a debit card, shopping in a department store with a credit card or earning free frequent flyer miles over the internet, at the heart of that transaction is an electronic transfer of funds or benefits enabled by the token, which acts to identify both the consumer as well as the financial account being accessed.

Also, there are transactions where the physical token is not required and the retailer allows payment by utilizing identifiers such account numbers, passwords, and/or personal identification numbers (PINs) to identify authorized users and control access to specific locations. Unfortunately, such methods for authorizing transactions or for controlling access can be easily compromised. Account numbers, passwords, PINs, etc. can be discovered by non-authorized persons or can be willingly disclosed by authorized users to non-authorized persons.

The growing field of biometrics provides one technological answer to this need for more reliable identification. Biometric technologies measure and characterize some unique feature of a person's anatomy, which is then used to identify that person.

A number of biometric identification devices already exist. These include fingerprint readers, hand geometry readers, iris imagers, retinal cameras, voice recognition, and face recognition devices. The biometric identification devices are used to verify that a person presented is indeed that person by comparing the presented person's biometric data to biometric data stored for the person specified. Authentication can be done for any purpose, such as security, tracking, crime prevention, customization of other systems to user preferences, communication and other purposes. Each of these biometric identification devices has its own problems and strong points.

Various token-based biometric technologies also exist. These suggest using smart cards, magnetic swipe cards, or paper checks in conjunction with fingerprints, hand prints, voice prints, retinal images, facial scans or handwriting samples. Biometrics are generally either stored in electronic and reproducible form on the token itself, or used in tandem with the user directly using magnetic swipe cards, paper checks or a PC. Therefore, a significant risk of fraud still exists because the comparison and verification process is not isolated from the hardware and software directly used by the payer attempting access.

There is a need to decrease the time required for transaction, to simplify the process where the customer is no longer required to present a physical token to identify themselves, and to simultaneously minimize the risk of fraud. It would be desirable to have an identification system that recognizes a customer based upon an "identifier" and a biometric sample for the purpose of authorizing a purchase or making changes to a record including the protection of a customer's account. Accordingly, the present invention is directed to these, as well as other, important ends.

SUMMARY OF THE INVENTION

The present invention provides a biometric identification system, method and product for facilitating a transaction in a point of sale environment. The biometric identification system facilitates creating or updating a biometric template based on biometric samples received from a customer belonging to an existing predetermined customer group. Further, the biometric identification system facilitates approving a transaction at the point of sale terminal based on a validated biometric sample received from a verified customer. One embodiment of the present invention may be used to decrease the time required for transaction at a point of sale environment, simplify the process where the customer is no longer required to present a physical token to identify themselves, and simultaneously minimize the risk of fraud. The biometric identification system of the present invention may be used to recognize a customer based upon an "identifier" and a biometric sample for the purpose of authorizing a purchase or making changes to a record and for the purpose of protecting the customer's account.

Accordingly, the present invention relates to a system for facilitating a transaction in a point of sale environment, which includes a biometric recognition device for receiving at least one biometric sample and at least one customer identifier at a point of sale terminal, and a validating mechanism for validating the biometric sample against a previously stored biometric template, wherein the previously stored biometric template includes a plurality of biometric samples from a customer belonging to a predefined customer group, wherein the transaction at the point of sale terminal is approved when the biometric sample is validated. More specifically, the customer identifier is selected from a group comprising Home Phone Number, Social Security Number, and Customer Account Number. The system according to present invention, further comprises a biometric database for storing the biometric template. More specifically, the biometric database includes Customer Home Phone Number, Customer Account Number, Customer Biometric Template, Customer Biometric Template Type, Customer Date and Time of Enrollment, Customer Enable/Disable Indicator, Merchant ORG, and Store ID. Also, according to the system of the present invention, the validation mechanism receives a merchant identifier from the point of sale terminal.

In another example, the system according to present invention further comprises a host-computing device for accommodating the validation mechanism.

In another example of the system according to present invention, the biometric sample comprises at least one of fingerprint information, retinal information, voice information, handwriting information, raw signature information, or composed signature information. In another example of the system according to present invention, the biometric recognition device converts the raw signature information to composed signature information prior to validating the biometric sample against the biometric template.

In another example of the system according to present invention, the host-computing device receives the biometric template from the biometric recognition device, wherein the biometric recognition devices receives the plurality of biometric samples, wherein the biometric recognition device creates the biometric template upon receiving the plurality of biometric samples, wherein the biometric samples comprises fingerprint information. In another example of the system according to present invention, the host-computing device receives a plurality of biometric samples prior to creating the biometric template, wherein the host-computing device creates the biometric template upon receiving the plurality of biometric samples, wherein the biometric samples comprises signature information.

In another example of the present invention, a method for facilitating a transaction in a point of sale environment is provided, which include the operative steps of receiving, from a customer belonging to a predefined customer group, at least one biometric sample and at least one customer identifier at a point of sale terminal, retrieving a previously stored biometric template associated with the customer identifier, the previously stored biometric template including a plurality of biometric samples from the customer, validating the biometric sample against the biometric template, and approving the transaction at the point of sale terminal based on the validated biometric sample. More specifically, the customer identifier can be selected from a group comprising, e.g., Home Phone Number, Social Security Number, and Customer Account Number.

In an example of the present invention, the biometric templates are previously stored during an enrollment phase, which include the operative steps of receiving at least two identifiers from a customer, verifying the customer identifiers against previously stored customer identifiers to determine when the customer belongs to an existing predefined customer group, receiving the plurality of biometric samples associated with the predefined customer group based on the verified customer identifiers when the customer belongs to an existing predefined customer group, creating or updating a biometric template based on the received biometric samples, and storing the biometric template in a biometric database. In another example of the present invention, at least three biometric samples are received from the customer.

In another example of the present invention, the enrollment phase further includes the operative step of removing the biometric template from the biometric database. More specifically, the biometric database includes Customer Home Phone Number, Customer Account Number, Customer Biometric Template, Customer Biometric Template Type, Customer Date and Time of Enrollment, Customer Enable/Disable Indicator, Merchant ORG, and Store ID.

In another example of the present invention, the method further includes the operative step of creating a new customer when the customer does not belong to a predefined customer group. In another example of the present invention, the method further includes the operative step of updating the biometric template based on the validated biometric sample. In another example of the present invention, the method further includes the operative step of receiving a merchant identifier from the point of sale terminal.

In another example of the present invention, the approval of transaction at the point of sale terminal includes providing access to a customer account associated with the customer identifier.

In another example of the present invention, the validation of the biometric sample against the biometric template is performed at a host-computing device.

In another example of the present invention, the biometric sample comprises at least one of fingerprint information, retinal information, voice information, handwriting information, raw signature information, or composed signature information. In another example of the present invention, the method further includes the operative step of converting the raw signature information to a composed signature information prior to validating the biometric sample against the biometric template.

In another example of the present invention, the plurality of biometric samples is received at the point of sale terminal during an enrollment phase and prior to creating a biometric template, wherein the biometric template is transmitted to a host-computing device, wherein the biometric samples comprises fingerprint information.

In yet another example of the present invention, each biometric sample from the plurality of biometric samples received during an enrollment phase is sent to a host-computing device prior to creating a biometric template at the host-computing device, wherein the biometric samples comprises signature information.

An example of the present invention is also directed to a computer program product residing on a computer readable medium, the computer program product comprising instructions for causing a computer to receive, from a customer belonging to a predefined customer group, at least one biometric sample and at least one customer identifier at a point of sale terminal, retrieve a previously stored biometric template associated with the customer identifier, the previously stored biometric template including a plurality of biometric samples from the customer, validate the biometric sample against the biometric template, and approve the transaction at the point of sale terminal based on the validated biometric sample. More specifically, the instructions for causing computer to approve the transaction at the point of sale terminal includes instructions for causing computer to provide access to a customer account associated with the customer identifier.

In one example, the computer program product according to the present invention further comprises instructions for causing computer to receive at least two identifiers from a customer, verify the customer identifiers against previously stored customer identifiers to determine when the customer belongs to an existing predefined customer group, receive the plurality of biometric samples associated with the predefined customer group based on the verified customer identifiers when the customer belongs to an existing predefined customer group, create or update a biometric template based on the received biometric samples, and store the biometric template in a biometric database. Also, the computer program product according to the present invention further comprises instructions for causing computer to create a new customer when the customer does not belong to a predefined customer group.

In another example, the computer program product according to the present invention further comprises instructions for causing computer to update the biometric template based on the validated biometric sample. In yet another example, the computer program product according to the present invention further comprises instructions for causing computer to receive a merchant identifier from the point of sale terminal.

DETAILED DESCRIPTION

Figure 1:
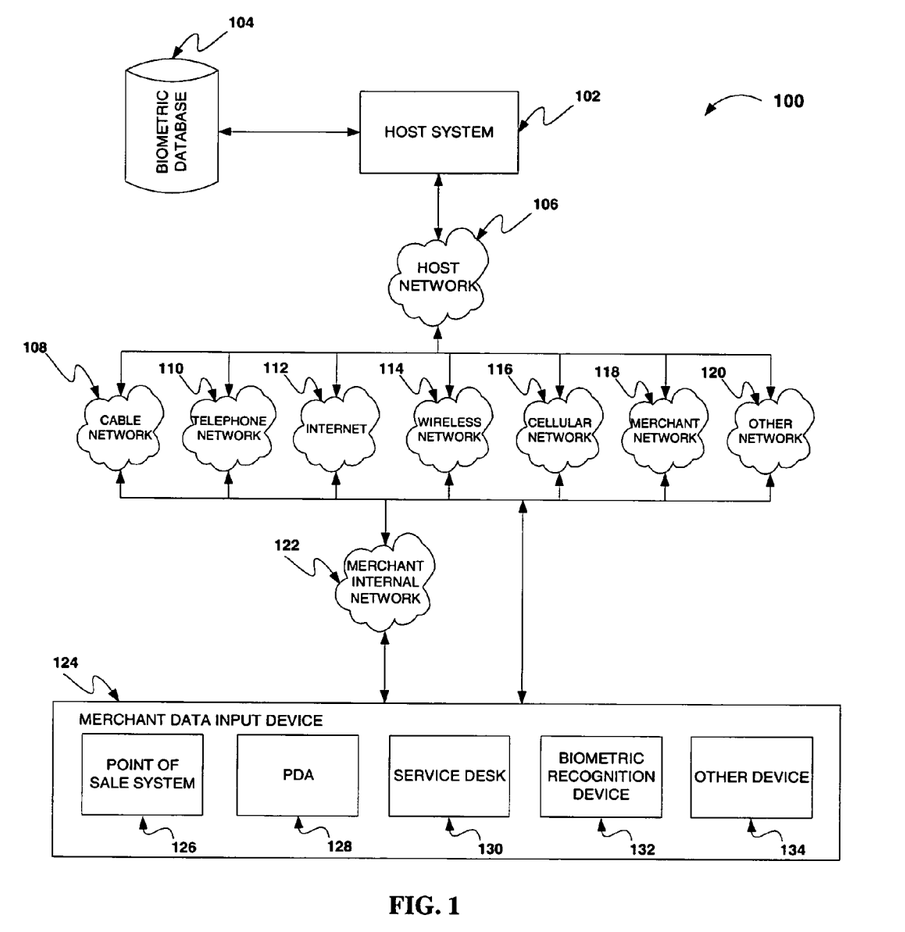
FIG. 1. is an embodiment of an exemplary biometric identification system in accordance with the present invention.

Embodiments of the present invention provide a biometric identification system, method and product for facilitating a transaction in a point of sale environment. Referring now to the drawings, and more particularly, to FIG. 1, there is shown a biometric identification system, generally designated 100, for facilitating a transaction in a point of sale environment that incorporates various embodiments of the present invention. System 100 includes at least one host system 102 (e.g., IBM Mainframe Computer, IBM Corporation, White Plains, N.Y.), at least one biometric database 104 (e.g., UDB database, IBM Corporation, White Plains, N.Y.), at least one host network 106, at least one cable network 108 (e.g., Comcast Corporation, Philadelphia, Pa.), at least one telephone network 110 (e.g., Digital Subscriber Line, Verizon, New York, N.Y.), at least one merchant internal network 122, and at least one merchant data input device 124, each as described in reference to FIG. 1.

In one example of the present invention, the merchant data input device 124 receives data from a customer to authorize a transaction. In one example of the present invention, the merchant data input device 124 may include at least one point of sale system 126, at least one Personal Digital Assistant (PDA) 128 (e.g., I-PAQ, Hewlett-Packard Company, Palo Alto, Calif.), at least one service desk 130, and at least one biometric recognition device 132 (e.g., ePad-id, Interlink Electronics Inc., Camarillo, Calif.). The merchant data input device 124 transmits the data via the merchant internal network 122 to a host system 102. The host system 102 receives the data via a host network 106 and utilizes this data to retrieve a biometric template previously stored in the biometric database 104. The host system 122 then validates this data against the previously stored biometric template to determine if the customer is authorized to proceed with the transaction. The host system 122 transmits the results of the validation back to the merchant data input device 124.

One or more embodiments of the present invention relate to an identification system that recognizes a customer belonging to a predefined customer group based on an identifier and validation of the customer's biometric sample. In one embodiment of the present invention, the predefined customer group includes customers having access to a single credit account opened by the predefined customer group, at a merchant, to purchase goods or services, wherein the line of credit can only be used at the merchant its subsidiaries, its partnerships, or through other relationships. Exemplary predefined customer groups include family members of a household, members of an organization, members of a club, and the like. The predefined customer group is assigned an identifier, and the customers belonging to the predefined customer group utilizes this identifier to validate themselves as belonging to the predefined group. In one embodiment of the present invention, identifiers for the predefined customer group include home phone number. One advantage contemplated by the use of predefined customer groups is to decrease time required to complete a transaction at a point of sale terminal by assigning customers to predefined customer groups and providing unique search parameters for targeted and reliable searches. Another advantage contemplated by the use of predefined customer groups is to simplify the process where the customer is no longer required to present a physical token to identify themselves and the verification is performed without accessing the financial account of the customer. In yet another advantage, the use of predefined customer groups with a biometric sample assists in recognizing a customer for the purpose of authorizing a purchase or making changes to a record and to simultaneously minimize the risk of fraud.

In another example of the present invention, the merchant data input device 124 receives data from a customer to enroll the customer's biometric data into a biometric database 104. The merchant data input device 124 receives at least two identifiers to determine if the customer is an existing customer. The merchant data input device 124 transmits the identifiers via the merchant internal network 122 to a host system 102. The host system 122 receives the identifiers via a host network 106 and utilizes these identifiers to verify if the customer belongs to a predetermined customer group. The host system 122 transmits the results of the verification back to the merchant data input device 124. Upon positive verification, the merchant data input device 124 receives a plurality of biometric sample data from the customer and transmits the biometric samples data to the host system 102. The host system stores the biometric samples data in the biometric database 104. In one embodiment of the present invention the biometric database 104 includes Customer Home Phone Number, Customer Account Number, Customer Biometric Template (e.g., having a format as generated by ePad-id, Interlink Electronics, Inc., Camarillo, Calif.), Customer Biometric Template Type, Customer Date and Time of Enrollment, Customer Enable/Disable Indicator, Merchant ORG, Store ID, and the like.

In this fashion, the biometric identification system 100 of the present invention allows an existing customer to enroll biometric sample data to the biometric database 104 and to recognize a customer based upon an identifier and biometric sample data for the purpose of authorizing a transaction.

Figure 2:
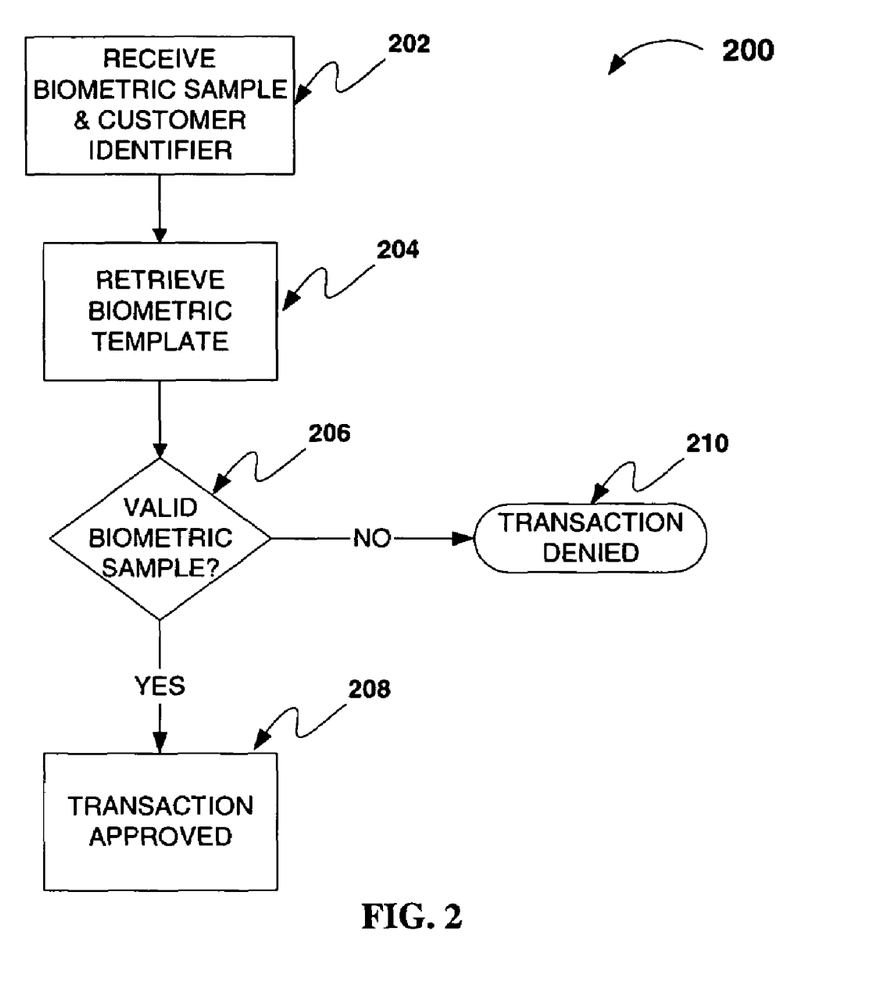
FIG. 2. is a flow diagram in accordance with an exemplary embodiment of the authorization process of the present invention.

FIG. 2, generally at 200, illustrates an exemplary method in accordance with an exemplary embodiment of the authorization process of the present invention. At step 202, the merchant data input device 124 receives data from a customer belonging to an existing predefined customer group in order to authorize a transaction (e.g., make a purchase at a store). In one embodiment of the present invention, the data received from the customer to authorize a transaction includes at least one biometric sample and at least one identifier. In one embodiment of the present invention, the customer identifier received includes Home Phone Number, Social Security Number, or Customer Account Number. In one embodiment of the present invention, the predefined customer group includes a household. Exemplary biometric sample types include fingerprint information, retinal information, voice information, handwriting information, raw signature information, composed signature information, and the like.

At step 204, host system 102 receives the aforementioned data from the merchant data input device 124 and retrieves a previously stored biometric template from the biometric database 104 associated with the customer identifier received in step 202. In one embodiment of the present invention, the data received by host system 102 at step 204 includes at least one biometric sample and at least one identifier. In another embodiment of the present invention, the data received by host system 102 at step 204 includes at least one biometric sample, at least one identifier, and at least one merchant identifier. In one embodiment of the present invention, the merchant identifier includes Merchant ORG. The biometric templates are previously created and stored utilizing an enrollment process using the exemplary method shown in FIG. 3.

Still referring to FIG. 2, at decision step 206, the host system 102 validates the biometric samples received against the previously stored biometric template. If the biometric samples do not match the previously stored biometric template, then the transaction is denied. If the biometric samples match the previously stored biometric template, then the host system provides access to the customer's account to facilitate the completion of transaction at step 208. In one embodiment of the present invention, the validated biometric samples are utilized to update the previously stored biometric template.

Figure 3:
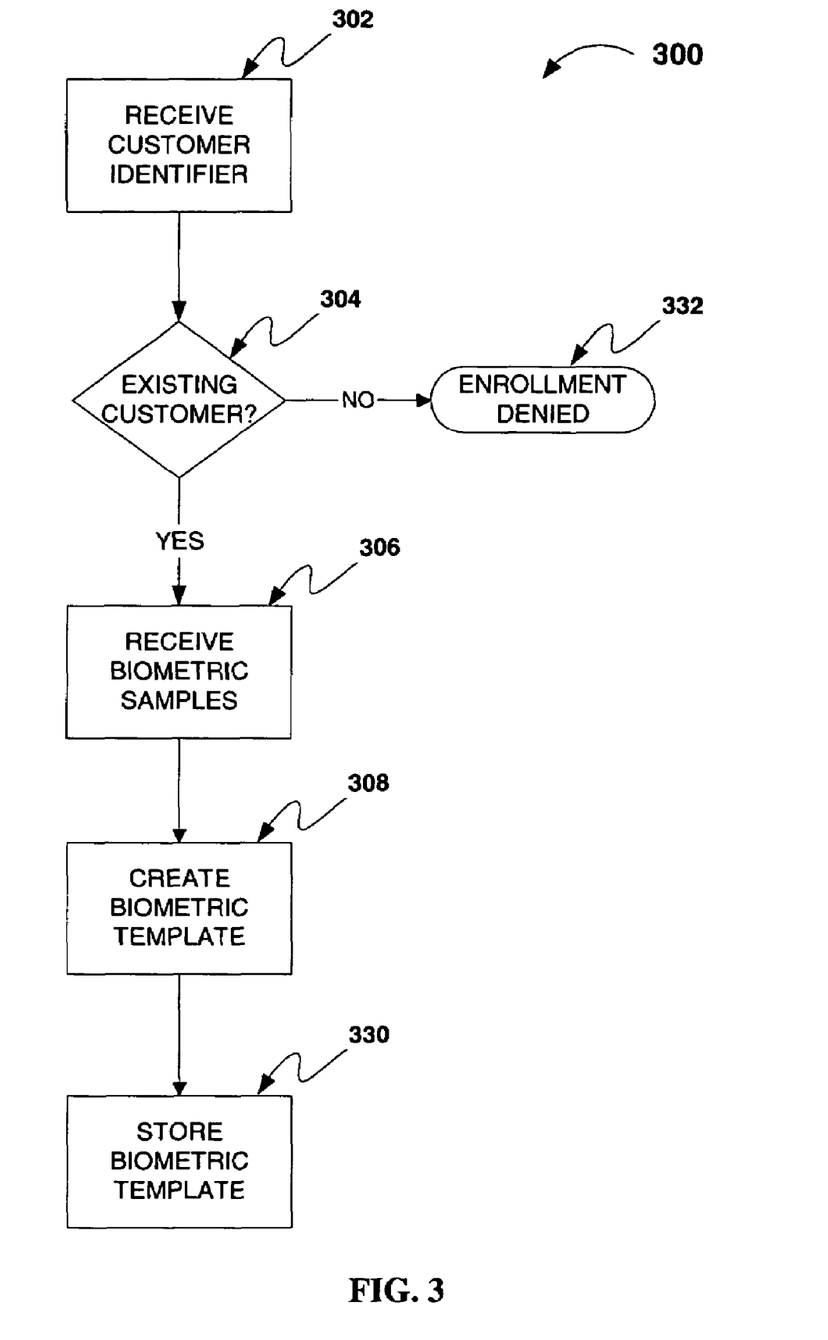
FIG. 3. is a flow diagram in accordance with an exemplary embodiment of the enrollment process of the present invention.

FIG. 3, generally at 300, illustrates an exemplary method in accordance with an exemplary embodiment of the enrollment process of the present invention. At step 302, the merchant data input device 124 receives at least two identifiers from a customer to determine if the customer belongs to a predetermined customer group. In an embodiment of the present invention, the customer identifiers include Home Phone Number, Social Security Number, Customer Account Number, and the like. In one embodiment of the present invention, the predefined customer group includes a household. In one embodiment of the present invention the merchant data input device 124 receives at least two identifiers from a customer to determine if the customer belongs to a predetermined customer group. at least one identifier from the merchant and In one embodiment of the present invention the merchant identifier includes Merchant ORG.

At decision step 304, the host system 102 receives data from the merchant data input device 124 and verifies the customer identifier against previously stored customer identifiers to determine if the customer belongs to a predefined customer group. In one embodiment of the present invention, the data received by host system 102 at decision step 304 includes at least two customer identifiers. In another embodiment of the present invention, the data received by host system 102 at step 304 includes at least two customer identifiers, and at least one merchant identifier. In one embodiment of the present invention, the merchant identifier includes Merchant ORG. If the customer does not belong to a predefined customer group the enrollment of the customer is denied at step 332. In one embodiment of the present invention, the customer is permitted to belong to a predefined customer group (and be considered, e.g., an "existing customer") if the customer has access to a credit account opened by the predefined customer group, at a merchant, to purchase goods or services, wherein the line of credit can only be used at the merchant, its subsidiaries, its partnerships, or through other relationships. In another embodiment of the present invention, the credit account opened by the predefined customer group must be in good standing.

If the customer belongs to a predefined customer group, then, at step 306 the merchant data input device 124 receives a plurality of biometric samples from the verified customer. In one embodiment of the present invention, the merchant data input device 124 receives at least three biometric samples. In another embodiment of the present invention, the merchant data input device 124 receives at least four biometric samples. In yet another embodiment of the present invention, the merchant data input device 124 receives at least six biometric samples. At step 308, a biometric template is created for the plurality of biometric samples received from the customer. The biometric template is stored within the biometric database at step 330.

Figure 4:
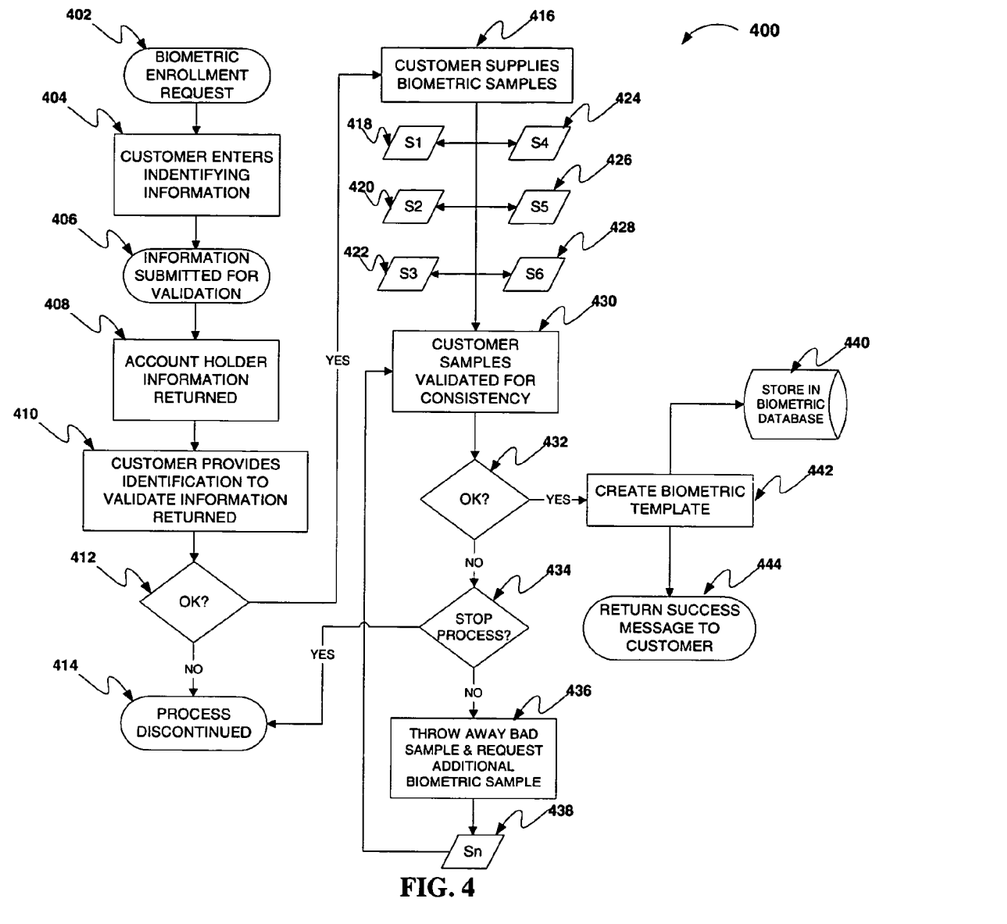
FIG. 4. is a second flow diagram in accordance with an exemplary embodiment of the enrollment process of the present invention.

FIG. 4, generally at 400, illustrates an exemplary method in accordance with another exemplary embodiment of the enrollment process of the present invention. At step 402, the merchant data input device 124 receives a biometric enrollment request from a customer. The customer then enters first identifying information at step 404. In one embodiment of the present invention, the first identifying information includes home phone number. The first identifying information entered is then submitted for validation, at step 406, against previously stored customer identifiers to return account holder information at step 408. At step 410, the customer then provides second identifier to validate the account holder information returned at step 408. In one embodiment of the present invention, the second customer identifier includes a physical token. Exemplary physical tokens include Drivers License, State Issued Photo Identification Card, Passport, and the like.

At decision step 412, the second customer identifier is validated to determine if the customer belongs to a predefined customer group. If the customer does not belong to a predefined customer group, the enrollment process is terminated. If the customer belongs to a predetermined customer group, the customer supplies a plurality of biometric samples at step 416. The customer biometric samples are validated for consistency at step 430. If the biometric samples are consistent, then at step 442, a biometric template is created from the biometric samples provided at step 416. If the biometric samples are not consistent, then at decision step 434, it is determined whether the process is allowed to continue or terminated. If the process is allowed to continue, then at step 436 the inconsistent biometric sample is discarded and additional samples are requested. The biometric template created at step 442 is stored in the biometric database 104.

Figure 5:
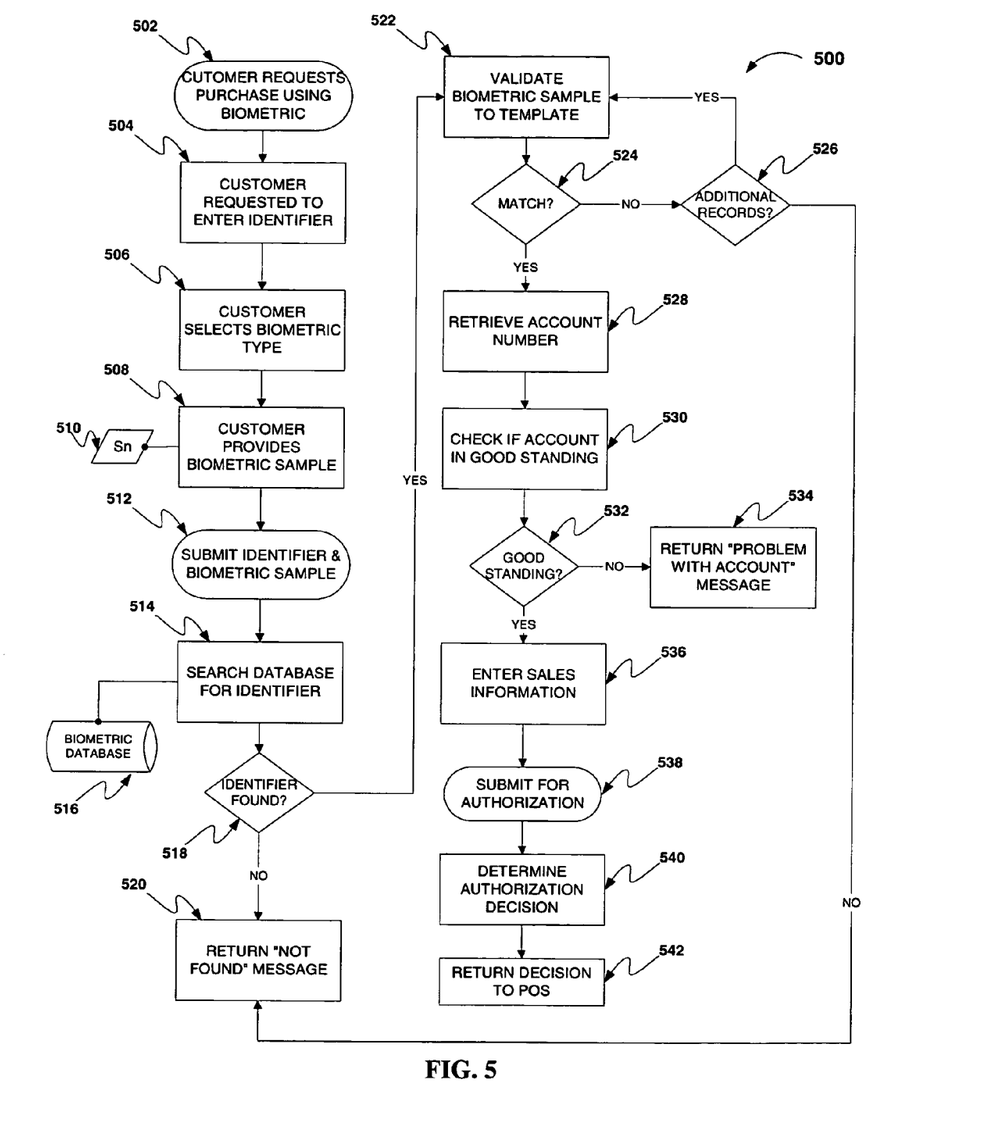
FIG. 5. is a second flow diagram in accordance with an exemplary embodiment of the authorization process of the present invention.

FIG. 5, generally at 500, illustrates an exemplary method in accordance with another exemplary embodiment of the authorization process of the present invention. At step 502, the merchant data input device 124 receives a request from a customer for purchase using biometric samples as identifiers. The system 100 requests the customer to enter a customer identifier at step 504. In one embodiment of the present invention, the customer identifier includes home phone number. At step 506, the customer then selects the type of biometric sample to be submitted and, at step 508, the customer provides at least one biometric sample. The customer identifier is verified at step 514 and, at decision step 518, the process is allowed to proceed if the customer belongs to an existing predefined customer group. At step 522, the biometric sample is validated and, at decision step 524, the process is allowed to proceed if the biometric sample is valid. The customer account number is retrieved at step 528 and at decision step 532, the account is verified to determine if the account is in "good standing." If the account is in "good standing", then at step 536, the merchant data input device 124 receives sales information. The sales information is then submitted for authorization at step 538. At step 540, the authorization decision is determined and the decision is sent to the merchant data input device 124 at step 542.

Figure 6:
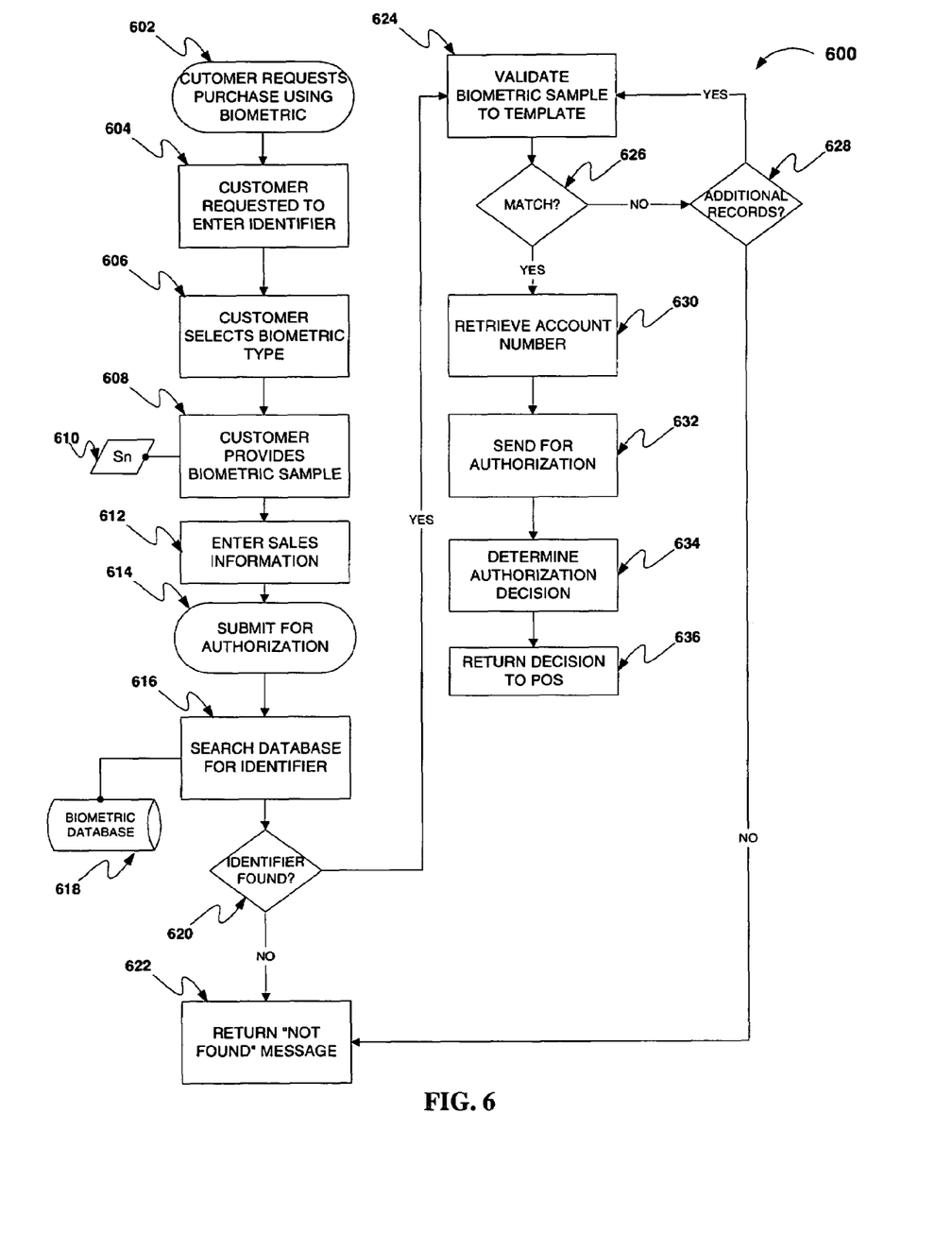
FIG. 6. is a third flow diagram in accordance with an exemplary embodiment of the authorization process of the present invention.

FIG. 6, generally at 600, illustrates an exemplary method in accordance with another exemplary embodiment of the authorization process of the present invention. The sales information is received by the merchant data input device 124 at step 612 and submitted for authorization at step 614 prior to customer verification at step 616. Once the customer identifier is verified at step 616 and the biometric sample is validated at step 624, the account is retrieved at step 630 and submitted for authorization at step 612. At step 634, the authorization decision is determined and the decision is sent to the merchant data input device 124 at step 636.

Figure 7:
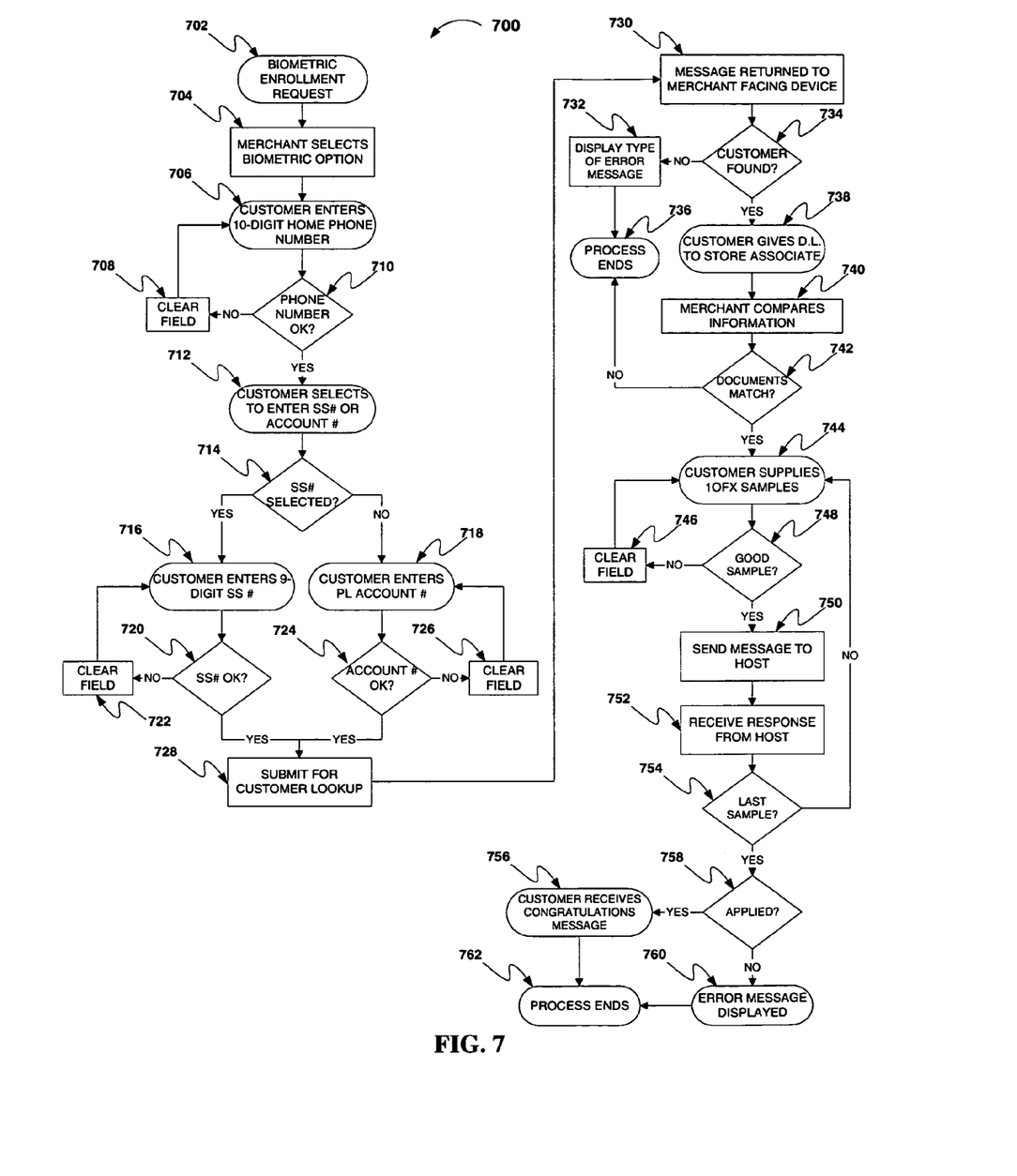
FIG. 7. is a third flow diagram in accordance with an exemplary embodiment of the enrollment process of the present invention.

FIG. 7, generally at 700, illustrates an exemplary method in accordance with another exemplary embodiment of the enrollment process of the present invention. At step 706, the customer provides home phone number as the first identifier. If the home phone number is determined to be valid at decision step 710, then the customer selects to provide either social security number or account number as the second identifier at step 712. If the customer selects to provide social security number, then at step 716, the customer provides the social security number. At decision step 720, the process is allowed to proceed if the social security number is determined to be valid. If the customer selects to provide account number, then at step 718, the customer provides the account number. At decision step 724, the process is allowed to proceed if the account number is determined to be valid.

Figure 8:
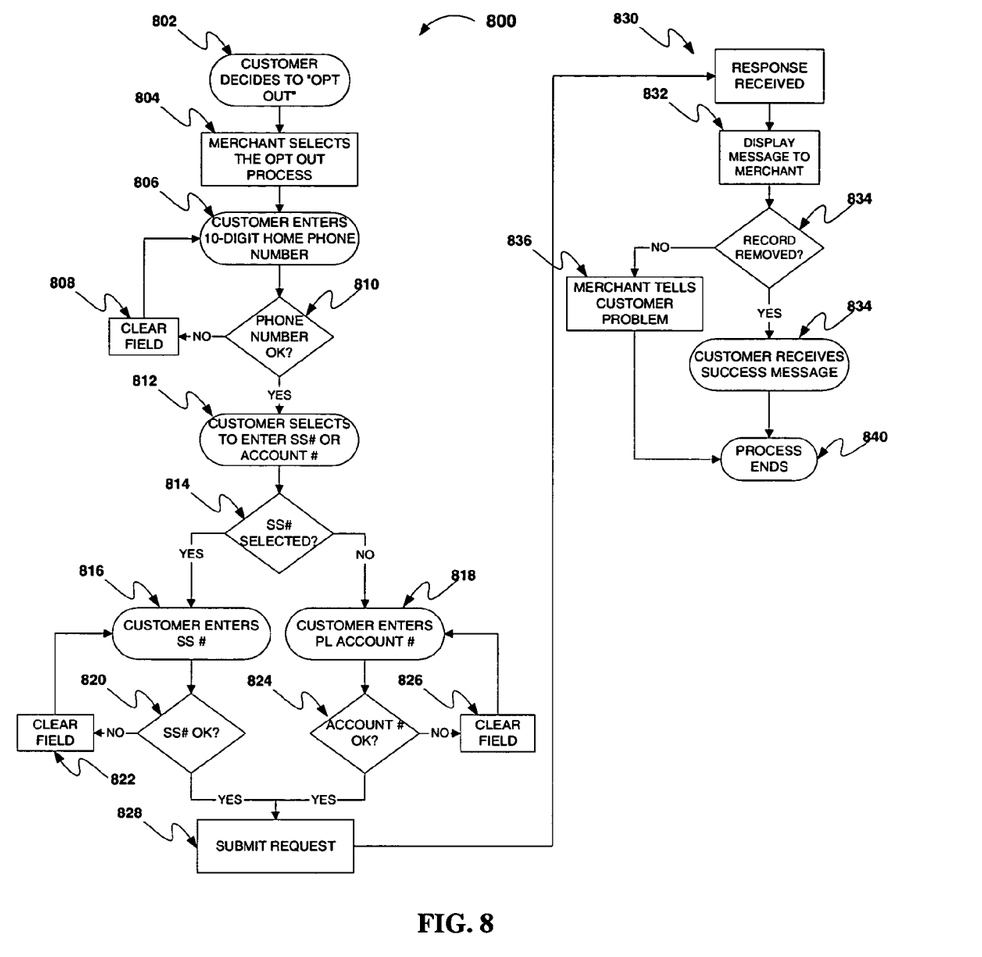
FIG. 8. is a flow diagram in accordance with an exemplary embodiment of the present invention that allows a customer to be removed from the biometric database.

FIG. 8, generally at 800, illustrates an exemplary method in accordance with another exemplary embodiment of the enrollment process of the present invention that allows a customer to be removed from the biometric database. At step 802, the merchant input device 124 receives a request from the customer to opt out of the biometric database 104. The customer provides their home phone number as the first identifier at step 806. At decision step the phone number is verified to determine if the process is allowed to proceed. If the process is allowed to proceed, then at step 812, the customer selects to provide either their social security number or an account number. The decision step 814 allows the customer to provide social security number at step 816 if the customer selects to provide social security number at step 812. If the social security number is verified at decision step 820, then the request for removal of customer record from the biometric database is submitted at step 828. The decision step 814 allows the customer to provide account number at step 818 if the customer selects to provide social security number at step 812. If the account number is verified at decision step 824, then the request for removal of customer record from the biometric database is submitted at step 828. At decision step 834, the merchant data input device 124 determines if the customer record is removed. If the customer record is removed, then at step 834, the merchant data input device 124 informs the customer that the customer record is removed and the process is terminated at step 840.

Figure 9:
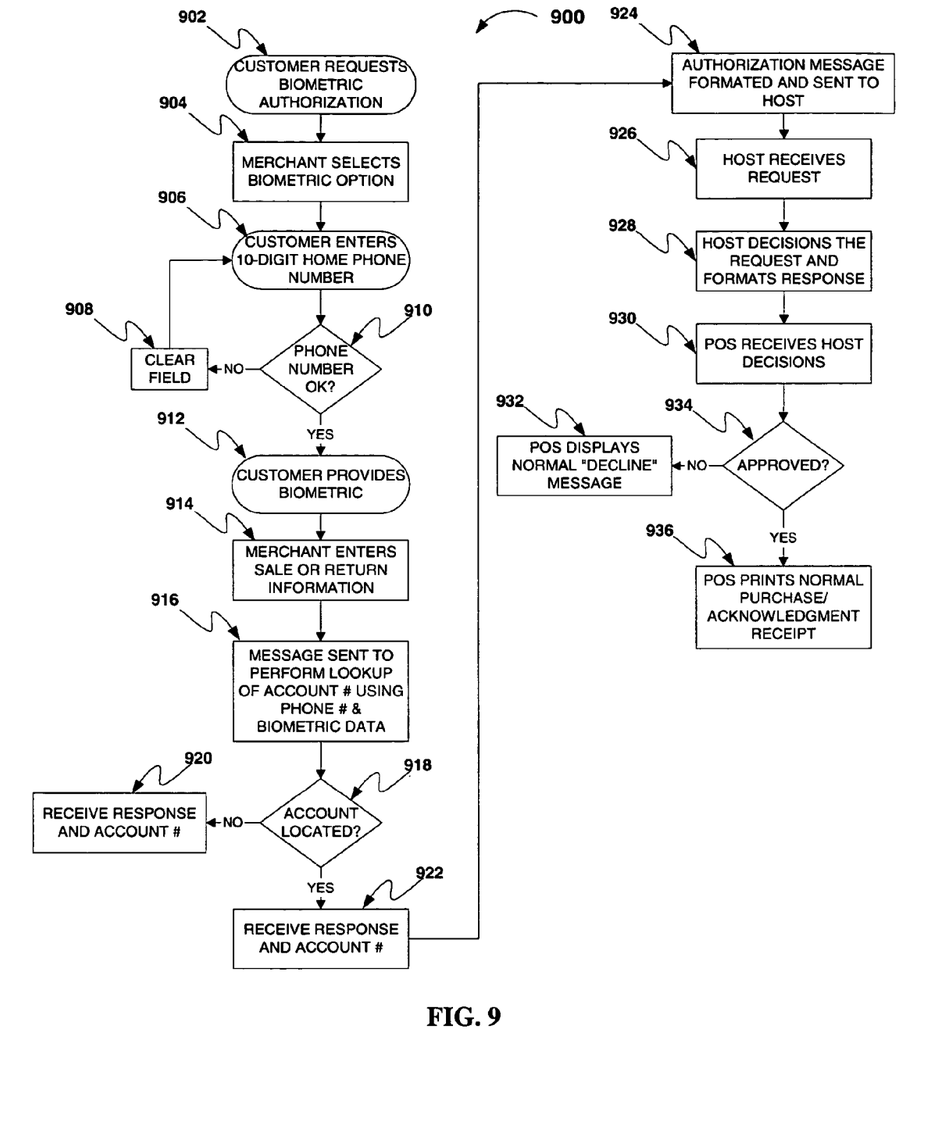
FIG. 9. is a flow diagram in accordance with an exemplary embodiment of the present invention that allows authorization and return of a transaction.

FIG. 9, generally at 900, illustrates an exemplary method in accordance with another exemplary embodiment of the authorization process of the present invention that allows authorization and return of a transaction. The merchant data input device 124 receives sales or return information at step 914, prior to customer account number retrieval at step 916. At decision step 918, the process is allowed to proceed if the account is located. If the account is located, then at step 926, the host system 102 receives the request to authorize and provides the merchant data input device 124 with the approval to facilitate the transaction at step 936.

Figure 10:
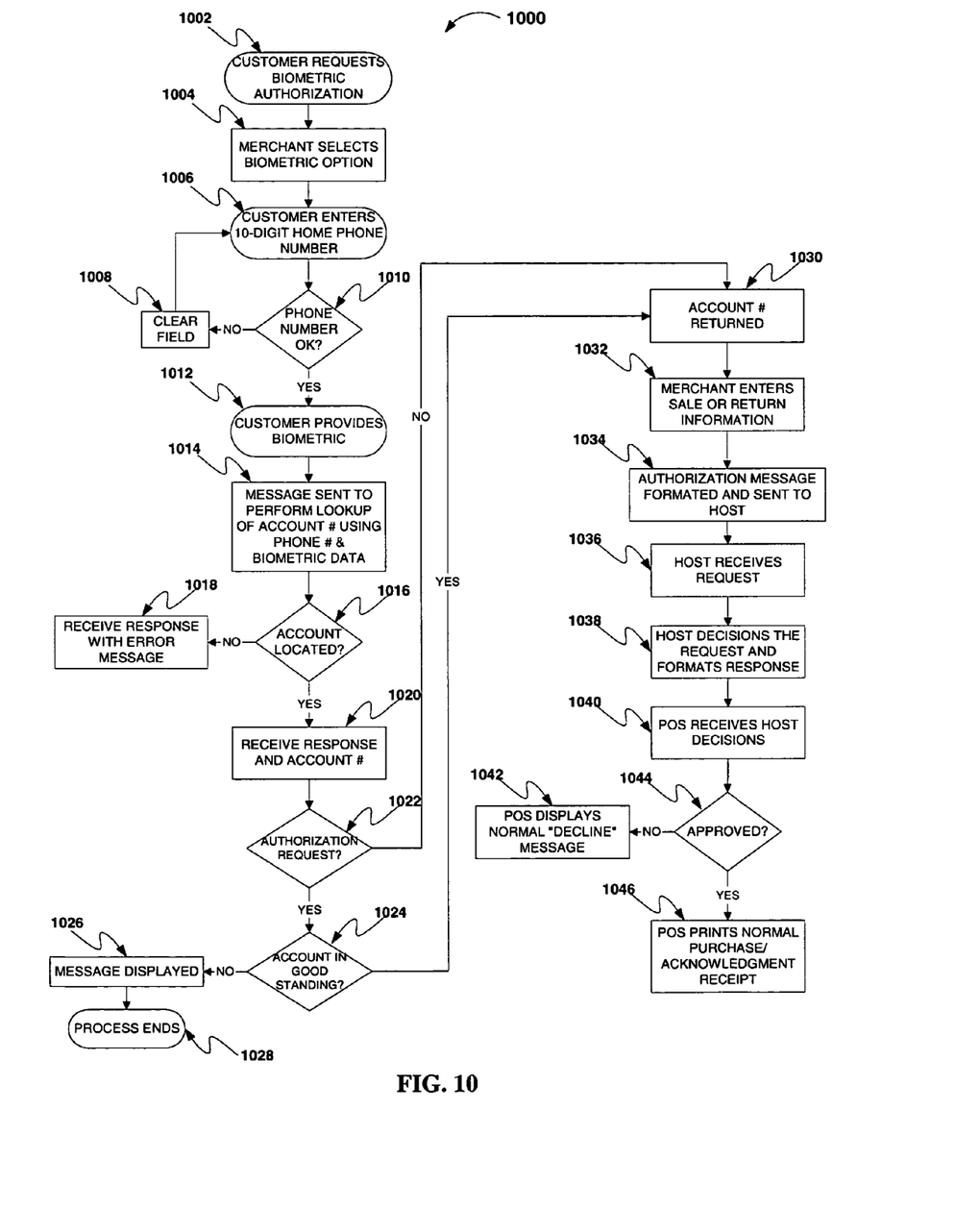
FIG. 10. is a second flow diagram in accordance with an exemplary embodiment of the present invention that allows authorization and return of a transaction.

FIG. 10, generally at 1000, illustrates an exemplary method in accordance with another exemplary embodiment of the authorization process of the present invention that allows authorization and return of a transaction. At step 1002, the merchant data input device 124 receives a request from a customer for purchase using biometric samples as identifiers. The system 100 receives home phone number from the customer at step 1006. At decision step 1010, the customer's home phone number is verified to determine if the customer belongs to an existing predefined customer group. If the customer belongs to an existing predetermined customer group, then at step 1012, the customer provides at least one biometric sample. At step 1014, the customer account is located based on the verified customer home phone number and the biometric sample. At decision step 1016, the process is allowed to proceed if the account is located. If the account is located, then at decision step 1024, the account is verified to determine if the account is in "good standing." If the account is in "good standing", then at step 1032, the merchant data input device 124 receives sales or return information. The sales or return information is then submitted to the host system 102 for authorization at step 1034. The decision step 1044 determines if the transaction is approved. If the transaction is approved then, at step 1046 the merchant data input device 124 receives the approval to facilitate the transaction at step 1046.

Parts of the present invention and corresponding detailed description are presented in terms of software, computer programs, or algorithms. Software includes symbolic representations of operations or steps stored in the form of data bits within a computer memory. An algorithm is a sequence of steps leading to a desired result(s). The steps are those requiring physical manipulations of physical quantities. Usually, though not necessarily, these quantities take the form of optical, electrical, or magnetic signals capable of being stored, transferred, combined, compared, and otherwise manipulated. Unless specifically stated otherwise, or as is apparent from the discussion, terms such as "processing" or "determining" or the like refer to the actions and processes of a computer system, or similar electronic computing device, that manipulates and transforms data represented as physical, electronic quantities within the computer system's memories into other data similarly represented as physical quantities within the computer system's memories or registers or other such information storage, transmission or display devices.

Although the above detailed description has shown, described and pointed out fundamental novel features of the invention as applied to the various embodiments discussed above, it will be understood that various omissions and substitutions and changes in the form and details of the device illustrated may be made by those skilled in the art, without departing from the spirit and scope of the invention. The described embodiments are to be considered in all respects only as illustrative and not restrictive.

I claim:

1. A system for facilitating a transaction in a point of sale environment comprising:
   a merchant input device for receiving at least one biometric sample and at least one customer identifier at a point of sale terminal wherein the at least one biometric sample and at least one customer identifier are transmitted from said merchant input device at the point of sale environment via a network to a host-computing device; and a validating mechanism located at the host-computing device receiving the at least one customer identifier and the at least one biometric sample, validating the at least one customer identifier to determine whether the customer is a member of a predefined customer group associated with the merchant including at least one of members of a household, members of an organization, and members of a club, and when said validating mechanism determines that the customer is the member of the predefined customer group, said validating mechanism validating the biometric sample against a previously stored biometric template associated with the customer identifier, wherein the previously stored biometric template includes a plurality of biometric samples from the customer belonging to the predefined customer group, wherein the transaction at the point of sale terminal is approved when the customer identifier and the biometric sample are validated and validation is transmitted via the network from the host-computing device to the merchant input device located at the point of sale environment.

2. The system according to claim 1, further comprising a biometric database for storing the biometric template.

3. The system according to claim 1, wherein the validation mechanism receives a merchant identifier from the point of sale terminal.

4. The system according to claim 1, wherein the customer identifier is selected from a group comprising Home Phone Number, Social Security Number, and Customer Merchant Account Number.

5. The system according to claim 2, wherein the biometric database includes Customer Home Phone Number, Customer Merchant Account Number, Customer Biometric Template, Customer Biometric Template Type, Customer Date and Time of Enrollment, Customer Enable/Disable Indicator, Merchant ORG, and Store ID.

6. The system according to claim 1, wherein the biometric sample comprises at least one of fingerprint information, retinal information, voice information, handwriting information, raw signature information, or composed signature information.

7. The system according to claim 6, wherein the biometric recognition device converts the raw signature information to a composed signature information prior to validating the biometric sample against the biometric template.

8. The system according to claim 1, wherein the host-computing device receives the biometric template from the biometric recognition device, wherein the biometric recognition devices receives the plurality of biometric samples, wherein the biometric recognition device creates the biometric template upon receiving the plurality of biometric samples, wherein the biometric samples comprises fingerprint information.

9. The system according to claim 1, wherein the host-computing device receives a plurality of biometric samples prior to creating the biometric template, wherein the host-computing device creates the biometric template upon receiving the plurality of biometric samples, wherein the biometric samples comprises signature information.

10. A system for facilitating a transaction in a point of sale environment comprising:

means for receiving and transmitting via a network to a host-computing device at least one biometric sample and at least one customer identifier at a point of sale terminal associated with a merchant; and means for validating the at least one customer identifier to determine whether the customer is a member of a predefined customer group associated with the merchant including at least one of members of a household, members of an organization, and members of a club;

means for retrieving at the host-computing device a previously stored biometric template associated with the customer identifier when said validating means determines that the customer is the member of the predefined customer group, the previously stored biometric template including a plurality of biometric samples from the customer;

means for validating the biometric sample against the previously stored biometric template, wherein the transaction at the point of sale terminal is approved when the biometric sample and the customer identifier is validated and the validation is transmitted from the host-computing device via the network to the point of sale terminal.

11. The system according to claim 10, further comprising:

means for receiving at least two identifiers from a customer;

means for verifying the customer identifiers against previously stored customer identifiers to determine when the customer belongs to an existing predefined customer group;

means for receiving the plurality of biometric samples associated with the predefined customer group based on the verified customer identifiers when the customer belongs to an existing predefined customer group;

means for creating or updating a biometric template based on the received biometric samples; and means for storing the biometric template in a biometric database.

12. The system according to claim 10, further comprising means for creating a new customer when the customer does not belong to a predefined customer group.

13. The system according to claim 10, further comprising means for receiving a merchant identifier from the point of sale terminal.

14. The system according to claim 10, wherein the customer identifier is selected from a group comprising Home Phone Number, Social Security Number, and Customer Account Merchant Number.

15. The system according to claim 10, wherein the biometric sample comprises at least one of fingerprint information, retinal information, voice information, handwriting information, raw signature information, or composed signature information.

16. A method for facilitating a transaction in a point of sale environment, the method comprising:

receiving and transmitting via a network to a host-computing device at least one biometric sample and at least one customer identifier at a point of sale terminal associated with a merchant;

validating the at least one customer identifier to determine whether the customer is a member of a predefined customer group associated with the merchant including at least one of members of a household, members of an organization, and members of a club;

when said validating determines that the customer is the member of the predefined customer group retrieving at the host-computing device a previously stored biometric template associated with the customer identifier, the previously stored biometric template including a plurality of biometric samples from the customer;

validating the biometric sample against the biometric template; and approving the transaction based on the validated customer identifier and the biometric sample and transmitting validation from the host-computing device via the network to the point of sale terminal.

17. The method according to claim 16, wherein the biometric templates are previously stored during an enrollment phase, wherein the enrollment phase comprises:

receiving at least two identifiers from a customer;

verifying the customer identifiers against previously stored customer identifiers to determine when the customer belongs to an existing predefined customer group;

receiving the plurality of biometric samples associated with the predefined customer group based on the verified customer identifiers when the customer belongs to an existing predefined customer group;

creating or updating a biometric template based on the received biometric samples; and storing the biometric template in a biometric database.

18. The method according to claim 16, further comprising creating a new customer when the customer does not belong to a predefined customer group.

19. The method according to claim 16, further comprising updating the biometric template based on the validated biometric sample.

20. The method according to claim 16, further comprising receiving a merchant identifier from the point of sale terminal.

21. The method according to claim 16, wherein approving the transaction at the point of sale terminal includes providing access to a customer account associated with the customer identifier.

22. The method according to claim 16, wherein the customer identifier is selected from a group comprising Home Phone Number, Social Security Number, and Customer Merchant Account Number.

23. The method according to claim 17, wherein at least three biometric samples are received from the customer.

24. The method according to claim 17, wherein the biometric database includes Customer Home Phone Number, Customer Merchant Account Number, Customer Biometric Template, Customer Biometric Template Type, Customer Date and Time of Enrollment, Customer Enable/disable Indicator, Merchant ORG, and Store ID.

25. The method according to claim 17, further comprising removing the biometric template from the biometric database.

26. The method according to claim 16, wherein the validation of the biometric sample against the biometric template is performed at a host-computing device.

27. The method according to claim 16, wherein the biometric sample comprises at least one of fingerprint information, retinal information, voice information, handwriting information, raw signature information, or composed signature information.

28. The method according to claim 27, further comprising converting the raw signature information to a composed signature information prior to validating the biometric sample against the biometric template.

29. The method according to claim 17, wherein the plurality of biometric samples is received at the point of sale terminal prior to creating a biometric template, wherein the biometric template is transmitted to a host-computing device, wherein the biometric samples comprises fingerprint information.

30. The method according to claim 17, wherein each biometric sample from the plurality of biometric samples received is sent to a host-computing device prior to creating a biometric template at the host-computing device, wherein the biometric samples comprises signature information.

31. A method for facilitating a transaction in a point of sale environment, the method comprising:

receiving and transmitting via a network to a host-computing device a plurality of first biometric samples associated with a customer belonging to an existing predetermined customer group including at least one of members of a household, members of an organization, and members of a club;

creating or updating a biometric template associated with the customer belonging to the predefined customer group based on the received first biometric samples;

receiving and transmitting via a network to the host-computing device a second biometric sample and a customer identifier;

retrieving the biometric template associated with the customer identifier when the customer identifier is validated, the customer identifier associated with the customer belonging to the predefined customer group;

validating the second biometric sample against the biometric template; and approving the transaction and transmitting approval from the host-computing device via the network to the point of sale terminal based on the validated biometric sample, wherein the previously stored biometric template includes a plurality of biometric samples from a customer belonging to a predefined customer group.

32. The method according to claim 31, further comprising:

receiving at least two customer identifiers; and verifying the customer identifiers against previously stored customer identifiers to determine when the customer belongs to an existing predefined customer group.

33. The method according to claim 31, further comprising creating a new customer when the customer does not belong to a predefined customer group.

34. The method according to claim 32, wherein said customer is verified prior to receiving said biometric samples.

35. The method according to claim 31, further comprising storing the biometric template in a biometric database.

36. The method according to claim 31, further comprising updating the biometric template based on the validated second biometric sample.

37. A computer program product residing on a computer readable medium, the computer program product comprising instructions for causing a computer to:

receive and transmit via a network to a host-computing device at least one biometric sample and at least one customer identifier at a point of sale terminal associated with a merchant;

validate the at least one customer identifier to determine whether the customer is a member of a predefined customer group associated with the merchant including at least one of members of a household, members of an organization, and members of a club;

when said validating determines that the customer is the member of the predefined customer group retrieve a previously stored biometric template, at the host-computing device, associated with the customer identifier, the previously stored biometric template including a plurality of biometric samples from the customer;

validate the biometric sample against the biometric template and transmit validation from the host-computing device via the network to the point of sale terminal; and
approve the transaction at the point of sale terminal based on the validated biometric sample.

38. The computer program product according to claim 37, further comprising instructions for causing computer to:
receive at least two identifiers from a customer;
verify the customer identifiers against previously stored customer identifiers to determine when the customer belongs to an existing predefined customer group;
receive the plurality of biometric samples associated with the predefined customer group based on the verified customer identifiers when the customer belongs to an existing predefined customer group;
create or update a biometric template based on the received biometric samples; and
store the biometric template in a biometric database.

39. The computer program product according to claim 37, further comprising instructions for causing computer to create a new customer when the customer does not belong to a predefined customer group.

40. The computer program product according to claim 37, further comprising instructions for causing computer to update the biometric template based on the validated biometric sample.

41. The computer program product according to claim 37, further comprising instructions for causing computer to receive a merchant identifier from the point of sale terminal.

42. The computer program product according to claim 37, wherein the instructions for causing computer to approve the transaction at the point of sale terminal includes instructions for causing computer to provide access to a customer account associated with the customer identifier.

43. A system for facilitating a transaction in a point of sale environment comprising:
a host-computing device that receives a plurality of biometric samples from a user prior to creating a biometric template and wherein the host-computing device creates the biometric template upon receiving the plurality of biometric samples;
a biometric recognition device at a point of sale terminal for receiving at least one biometric sample including at least one of fingerprint information, retinal information, voice information, handwriting information, raw signature information, and composed signature information;
at least one customer identifier selected from a group comprising home phone number, social security number, and customer account number at the point of sale terminal;
a merchant identifier comprising at least one of a merchant ORG and store ID associated with the point of sale terminal;
wherein the at least one biometric sample, at least one customer identifier, and the merchant identifier are transmitted from the point of sale device via a network to the host-computing device;
a validating mechanism at the host-computing device receiving the at least one biometric sample, at least one customer identifier, and the merchant identifier validating the customer identifier and validating the biometric sample against the previously stored biometric template in a biometric database, wherein the previously stored biometric template includes a plurality of biometric samples previously received from a user belonging to a predefined user group including at least one of members of a household, members of an organization, and members of a club; and
wherein the transaction at the point of sale terminal is approved when the biometric sample is validated and validation is transmitted via the network to the point of sale terminal.

44. A method for facilitating a transaction in a point of sale environment, the method comprising:
an enrollment phase including receiving at least two identifiers from a customer; verifying the customer identifiers against previously stored customer identifiers to determine when the customer belongs to an existing predefined customer group; creating a new customer when the customer does not belong to a predefined customer group; receiving a plurality of biometric samples including at least one of fingerprint information, retinal information, voice information, handwriting information, raw signature information, and composed signature information associated with the predefined customer group based on the verified customer identifiers when the customer belongs to an existing predefined customer group; creating or updating a biometric template based on the received biometric samples; and
storing the biometric template in a biometric database including Customer Home Phone Number, Customer Merchant Account Number, Customer Biometric Template, Customer Biometric Template Type, Customer pate and Time of Enrollment, Customer Enable/Disable Indicator, Merchant ORG, and Store ID;
receiving and transmitting via a network to a host-computing device, from a customer belonging to a predefined customer group including at least one of members of a household, members of an organization, and members of a club, at least one biometric sample and at least one customer identifier selected from a group comprising Home Phone Number, Social Security Number, and Customer Merchant Account Number at a point of sale terminal and a merchant identifier from the point of sale terminal;
validate the at least one customer identifier to determine whether the customer is a member of a predefined customer group associated with the merchant;
retrieving at the host-computing device a previously stored biometric template associated with the customer identifier, the previously stored biometric template including a plurality of biometric samples from the customer;
validating the biometric sample against the biometric template performed at a host-computing device; and
approving the transaction based on the validated biometric sample and transmitting validation from the host-computing device via the network to the point of sale terminal and wherein approving the transaction at the point of sale terminal includes providing access to a customer account associated with the customer identifier.

* * * * *